United States Patent
Iijima

(10) Patent No.: US 9,233,336 B2
(45) Date of Patent: Jan. 12, 2016

(54) CARBON DIOXIDE RECOVERY SYSTEM AND METHOD

(75) Inventor: Masaki Iijima, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 203 days.

(21) Appl. No.: 13/338,408

(22) Filed: Dec. 28, 2011

(65) Prior Publication Data

US 2012/0255305 A1    Oct. 11, 2012

(30) Foreign Application Priority Data

Apr. 6, 2011 (JP) ................................ 2011-084930

(51) Int. Cl.
*F01K 23/06* (2006.01)
*B63H 11/12* (2006.01)
(Continued)

(52) U.S. Cl.
CPC ........ *B01D 53/1425* (2013.01); *B01D 53/1475* (2013.01); *F01K 7/06* (2013.01);
(Continued)

(58) Field of Classification Search
CPC ............. F02B 47/02; F01K 7/16; F01K 7/32; F01K 7/34; F01K 11/04; F01K 15/02; F01K 21/005; F01K 21/02; F01K 25/06; F01K 25/065; F01K 25/08; F01K 25/10; F03G 7/06; F01B 17/04
USPC .............. 60/648, 649, 653, 772, 39.182, 645, 60/673, 679, 227, 514, 531, 670, 676, 707, 60/784; 423/220, 226, 437.1, 437.2
See application file for complete search history.

(56) References Cited

U.S. PATENT DOCUMENTS 5,339,633 A * 8/1994 Fujii et al. ........................ 60/648
5,344,627 A * 9/1994 Fujii et al. ..................... 423/220
(Continued)

FOREIGN PATENT DOCUMENTS

JP    3-193116 A    8/1991
JP    5-184868 A    7/1993
(Continued)

OTHER PUBLICATIONS

Merriam Webster dictionary online—"branch" defined from source: http://www.merriam-webster.com/dictionary/branch; obtained Feb. 25, 2015; 4 pages.*

(Continued)

*Primary Examiner* — Jorge Pereiro
*Assistant Examiner* — Daniel Wagnitz
(74) *Attorney, Agent, or Firm* — Westerman, Hattori, Daniels & Adrian, LLP

(57) ABSTRACT

A carbon dioxide recovery system includes a high-pressure 11, a boiler 15, a carbon dioxide recovery unit 24 that includes a carbon dioxide absorber 21 that absorbs and reduces carbon dioxide in flue gas G emitted from the boiler 15 using a carbon dioxide absorbent and an absorbent regenerator 23 that regenerates a carbon dioxide absorbent having absorbed the carbon dioxide using a regenerating superheater 22 to obtain a regenerated carbon dioxide absorbent, a high-temperature and high-pressure steam extraction line $L_{11}$ that extracts the high-temperature and high-pressure steam 14 from the boiler 15 before the steam is introduced into the high-pressure turbine 11, an auxiliary turbine 32 that recovers power with the high-temperature and high-pressure steam 14, and a steam supply line $L_{12}$ that supplies emission steam 33 emitted from the auxiliary turbine 32 to the regenerating superheater 22 to be used as a heat source.

2 Claims, 4 Drawing Sheets

(51) Int. Cl.

| | |
|---|---|
| *F02K 9/50* | (2006.01) |
| *F03C 1/00* | (2006.01) |
| *B01D 53/14* | (2006.01) |
| *B01D 53/56* | (2006.01) |
| *C01B 17/16* | (2006.01) |
| *C01B 31/20* | (2006.01) |
| *F23J 15/00* | (2006.01) |
| *F01K 7/06* | (2006.01) |
| *F01K 19/00* | (2006.01) |
| *B01D 53/62* | (2006.01) |

(52) U.S. Cl.
CPC .............. *F01K 19/00* (2013.01); *F23J 15/006* (2013.01); *B01D 53/62* (2013.01); *B01D 2257/504* (2013.01); *B01D 2258/0283* (2013.01); *B01D 2259/65* (2013.01); *F23J 2215/50* (2013.01); *F23J 2219/40* (2013.01); *Y02C 10/04* (2013.01); *Y02C 10/06* (2013.01)

(56) References Cited

U.S. PATENT DOCUMENTS

| | | | | |
|---|---|---|---|---|
| 2003/0233830 | A1* | 12/2003 | Marin et al. | 60/649 |
| 2004/0221578 | A1* | 11/2004 | Iijima et al. | 60/649 |
| 2006/0248890 | A1* | 11/2006 | Iijima et al. | 60/645 |
| 2007/0006565 | A1* | 1/2007 | Fleischer et al. | 60/39.5 |
| 2008/0141672 | A1* | 6/2008 | Shah et al. | 60/648 |
| 2009/0151318 | A1* | 6/2009 | Handagama et al. | 60/39.182 |
| 2010/0050637 | A1* | 3/2010 | Yamashita et al. | 60/653 |
| 2010/0326074 | A1* | 12/2010 | Okita et al. | 60/648 |
| 2011/0048011 | A1* | 3/2011 | Okita et al. | 60/649 |
| 2011/0232286 | A1* | 9/2011 | Mishima et al. | 60/670 |
| 2012/0096861 | A1* | 4/2012 | Sasanuma et al. | 60/645 |
| 2012/0096863 | A1* | 4/2012 | Sasanuma et al. | 60/653 |
| 2012/0096865 | A1* | 4/2012 | Murakami et al. | 60/676 |
| 2012/0192564 | A1* | 8/2012 | Mishima et al. | 60/676 |
| 2012/0227372 | A1* | 9/2012 | Li et al. | 60/39.182 |
| 2012/0240579 | A1* | 9/2012 | Hirata et al. | 60/653 |
| 2013/0229012 | A1* | 9/2013 | Jovanovic et al. | 60/645 |
| 2013/0269346 | A1* | 10/2013 | Li et al. | 60/645 |
| 2014/0033716 | A1* | 2/2014 | Itou et al. | 60/707 |
| 2014/0041394 | A1* | 2/2014 | Jovanovic et al. | 60/784 |

FOREIGN PATENT DOCUMENTS

| | | |
|---|---|---|
| JP | 2002-227611 A | 8/2002 |
| JP | 2004-323339 A | 11/2004 |
| JP | 2011-020090 A | 2/2011 |
| JP | 2011-508842 A | 3/2011 |

OTHER PUBLICATIONS

Oxford American English dictionary online—"branch" defined from source: http://www.oxforddictionaries.com/us/definition/american_english/branch; obtained Feb. 25, 2015; 12 pages.*
American Heritage dictionary online—"branch" defined from source: https://www.ahdictionary.com/word/search.html?q=branch; obtained Feb. 25, 2015; 3 pages.*
Collins English dictionary online—"branch" defined from source: http://www.collinsdictionary.com/dictionary/english/branch; obtained Feb. 25, 2015; 3 pages.*
Webster's New World College dictionary, American Heritage dictionary, and Wiktionary—"branch" defined from source: http://www.yourdictionary.com/branch; obtained Feb. 25, 2015; 3 pages.*
Canadian Office Action dated Mar. 8, 2013, issued in corresponding Canadian Patent Application No. 2,765,896; 3 pages.
Extended European Search Report dated Jul. 9, 2012, issued in corresponding European Patent Application No. 12160124.9 (8 pages).
Notice of Allowance dated Nov. 8, 2013, issued in corresponding Canadian application No. 2,765,896.
Australian Notice of Acceptance dated Jan. 31, 2014, issued in corresponding Australian application No. 2012200705 (1 page).
Decision of Patent Grant Mar. 31, 2015, issued in corresponding Japanese Patent Application No. 2011-084930 with English partial translation (2 pages).
Office Action dated Jan. 6, 2015, issued in corresponding Japanese Patent Application No. 2011-084930, with English translation (6 pages).

* cited by examiner

CARBON DIOXIDE RECOVERY SYSTEM AND METHOD

FIELD

The present invention relates to a carbon dioxide recovery system and a carbon dioxide recovery method that can reliably regenerate a carbon dioxide absorbent even when operation loads of a boiler or a steam turbine in a power generation system vary.

BACKGROUND

The greenhouse effect of $CO_2$ has been recently pointed out as one factor of the global warming phenomenon and it has become an international urgent issue to take measures in preserving earth environments. All fields of human activities that involve burning of fossil fuels are $CO_2$ generation sources, and needs for $CO_2$ emission limitation are becoming increasingly great. Accordingly, methods that enable to bring flue gas of a boiler into contact with an amine $CO_2$ absorbent to reduce or recover $CO_2$ in the flue gas, and methods that enable to store recovered $CO_2$ without releasing $CO_2$ to the atmosphere have been intensively studied for power-generating facilities such as thermal power plants that use a large amount of fossil fuels. As steps that enable to reduce or recover $CO_2$ from flue gas by using a $CO_2$ absorbent as described above, a step of bringing flue gas into contact with a $CO_2$ absorbent in an absorber and a carbon dioxide recovery system that heats an absorbent having absorbed $CO_2$ in a regenerator to liberate $CO_2$ as well as regenerates the absorbent and circulates the regenerated absorbent again in the regenerator to reuse the absorbent are adopted.

This carbon dioxide recovery system causes carbon dioxide contained in gas in the absorber to be absorbed by the absorbent and then be heated in the regenerator, thereby separating the carbon dioxide from the absorbent, so that the separated carbon dioxide is separately recovered and a regenerated absorbent is cyclically used again in the absorber.

To separate and recover carbon dioxide in the regenerator, the absorbent needs to be heated by a regenerating superheater and heating steam at a prescribed pressure needs to be supplied thereto. When $CO_2$ is to be recovered from flue gas of a practical power plant, a large amount of steam is required to regenerate the absorbent.

To supply the steam, methods that enable to bleed steam from a steam turbine of a power generation system, that enable to bleed steam from each header between a high-pressure turbine (HP) and an intermediate-pressure turbine (MP) or between an intermediate-pressure turbine (MP) and a low-pressure turbine (LP), or that enable to recover power from bled steam using a steam turbine and supply emission to a regenerating superheater in a $CO_2$ recovery system have been proposed (see Japanese Patent Application Laid-open No. 2004-323339).

CITATION LIST

Patent Literature

Patent Literature 1: Japanese Patent Application Laid-open No. H03-193116

Patent Literature 2: Japanese Patent Application Laid-open No. 2004-323339

SUMMARY

Technical Problem

The methods mentioned above involve significant modification of a steam system or installation of a turbine in the existing power generation system and also, both in the existing and newly-built power generation systems, greatly change the steam pressure along with changes in loads of power-generating facilities or changes in steam to be used in the $CO_2$ recovery system or a use amount thereof while the $CO_2$ recovery system uses steam at a fixed pressure. Therefore, quite complicated system control is required to address these situations.

Besides, because these systems use superheated steam for the regenerating superheater to recover $CO_2$, the steam is used by decreasing the temperature with water before the steam enters the regenerating superheater and accordingly there is energy loss in the steam pressure.

The present invention has been achieved in view of the above problems, and an object of the present invention is to provide a carbon dioxide recovery system and a carbon dioxide recovery method that enable to reliably regenerate a carbon dioxide absorbent without imposing loads on a boiler and steam turbine facilities.

Solution to Problem

According to an aspect of the present invention, a carbon dioxide recovery system includes: a high-pressure turbine, an intermediate-pressure turbine, and a low-pressure turbine; a boiler that generates steam for driving these turbines; a carbon dioxide recovery unit that includes a carbon dioxide absorber that absorbs and reduces carbon dioxide in flue gas emitted from the boiler using a carbon dioxide absorbent, and an absorbent regenerator that regenerates a carbon dioxide absorbent having absorbed the carbon dioxide using a regenerating superheater to obtain a regenerated carbon dioxide absorbent; a high-temperature and high-pressure steam extraction line that extracts high-temperature and high-pressure steam from the boiler before the steam is introduced into the high-pressure turbine; an auxiliary turbine that recovers power using the extracted high-temperature and high-pressure steam; and a steam supply line that supplies emission steam emitted from the auxiliary turbine to the regenerating superheater of the carbon dioxide regenerator to be used as a heat source.

Advantageously, the carbon dioxide recovery system further includes a high-pressure auxiliary turbine and a low-pressure auxiliary turbine that recover power with the extracted high-temperature and high-pressure steam. Intermediate-pressure steam obtained by reheating in the boiler emission from the high-pressure auxiliary turbine is extracted before being introduced into the intermediate-pressure turbine, and heat exchange between the emission from the high-pressure auxiliary turbine and the reheated intermediate-pressure steam is performed in a heat exchanger.

Advantageously, the carbon dioxide recovery system further includes the high-pressure auxiliary turbine and the low-pressure auxiliary turbine that recover power with the extracted high-temperature and high-pressure steam. The emission from the high-pressure auxiliary turbine is reheated in the boiler and introduced into the low-pressure auxiliary turbine.

Another aspect of the present invention is a carbon dioxide recovery method of recovering carbon dioxide absorbed in the carbon dioxide absorbent using the carbon dioxide recovery system according to any one of described above.

Advantageous Effects of Invention

According to the present invention, the high-temperature and high-pressure steam from the boiler is extracted through the extraction line before being supplied to the high-pressure turbine, power is recovered by the auxiliary turbine using the extracted steam, and steam emitted from the auxiliary turbine is supplied to the regenerating superheater. Therefore, also when operation loads of the boiler or the steam turbine of the power generation system vary, stable steam for the regenerating superheater can be supplied and regeneration of the absorbent can be reliably performed, resulting in stable recovery of carbon dioxide.

DESCRIPTION OF EMBODIMENTS

The present invention will be explained below in detail with reference to the accompanying drawings. The present invention is not limited to the embodiment, and when there are a plurality of embodiments, configurations made by combining these embodiments are also included in the present invention. In addition, constituent elements in the following embodiments include those that can be easily assumed by persons skilled in the art, or that are substantially equivalent.

First Embodiment

Figure 1:
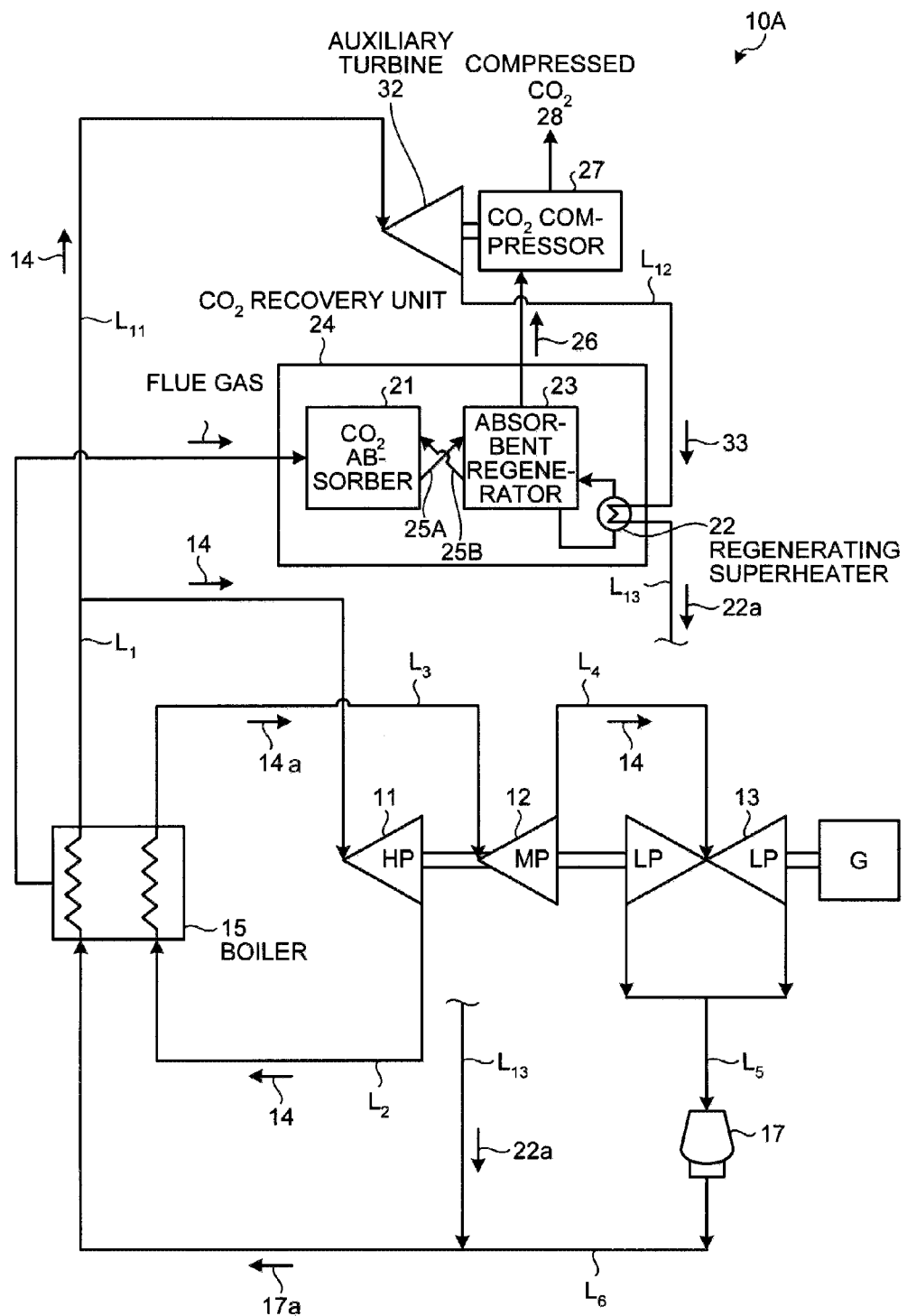
FIG. 1 is a schematic diagram of a carbon dioxide recovery system according to a first embodiment of the present invention.

A carbon dioxide recovery system according to a first embodiment of the present invention is explained with reference to the drawings. FIG. 1 is a schematic diagram of a carbon dioxide recovery system according to the first embodiment.

As shown in FIG. 1, a carbon dioxide recovery system 10A includes a high-pressure turbine 11, an intermediate-pressure turbine 12, a low-pressure turbine 13, a boiler 15 that generates steam 14 for driving these turbines, a carbon dioxide recovery unit ($CO_2$ recovery unit) 24 including a carbon dioxide absorber ($CO_2$ absorber) 21 that absorbs and reduces carbon dioxide in flue gas (emission gas) emitted from the boiler 15 using a carbon dioxide absorbent, and an absorbent regenerator 23 that regenerates a carbon dioxide absorbent having absorbed the carbon dioxide using a regenerating superheater 22 to obtain a regenerated carbon dioxide absorbent, a high-temperature and high-pressure steam extraction line $L_{11}$ that extracts the high-temperature and high-pressure steam 14 from the boiler 15 before the steam is introduced into the high-pressure turbine 11, an auxiliary turbine 32 that recovers power using the extracted high-temperature and high-pressure steam 14, and a steam supply line $L_{12}$ that supplies emission steam 33 emitted from the auxiliary turbine 32 to the regenerating superheater 22 of the absorbent regenerator 23 to be used as a heat source.

Reference sign 17 denotes a condenser, 17a and 22a denote condensed water, $L_1$ denotes a supply line for the high-temperature and high-pressure steam 14, $L_2$ to $L_5$ denote steam lines, $L_6$ denotes a supply line for the condensed water 17a, and $L_{13}$ denotes a supply line for the condensed water 22a.

The carbon dioxide absorbent is composed of a carbon dioxide absorbent (rich solution) 25A that has absorbed carbon dioxide in the $CO_2$ absorber 21 and a regenerated carbon dioxide absorbent (lean solution) 25B that is regenerated by releasing carbon dioxide using the regenerating superheater 22 in the regenerator 23, and the absorber 21 and the regenerator 23 are cyclically reused.

$CO_2$ gas 26 accompanied by water vapor emitted from the absorbent regenerator 23 is compressed by a $CO_2$ compressor 27 to obtain compressed $CO_2$ 28.

The high-pressure and high-temperature steam 14 generated and heated by the boiler 15 drives the high-pressure turbine 11, then is resuperheated by a resuperheater (not shown) in the boiler 15 as high-pressure turbine emission, and sent to the intermediate-pressure turbine 12 and then to the low-pressure turbine 13 as resuperheated intermediate-pressure steam.

Emission from the low-pressure turbine 13 is condensed by the condenser 17, and condensed water 17a is sent to the boiler as boiler supply water.

An amine absorbent can be cited as an example of the carbon dioxide absorbent that absorbs $CO_2$. Specifically, monoethanolamine, diethanolamine, triethanolamine, methyldiethanolamine, diisopropanolamine, and diglycolamine as alkanolamine, and also hindered amines can be cited as examples. Solutions of one of these or mixed solutions of two or more of these can be also cited. Usually, a monoethanolamine solution is preferably used.

In the present invention, before being supplied to the high-pressure turbine 11, the high-temperature and high-pressure steam 14 is extracted from the boiler 15 through the extraction line $L_{11}$, and power is recovered by the auxiliary turbine 32 using the extracted steam. The emission steam 33 emitted from the auxiliary turbine 32 is then used and supplied through the steam supply line $L_{12}$ as a heat source to the regenerating superheater 22 that is used when the carbon dioxide absorbent 25A having absorbed carbon dioxide is to be regenerated in the absorbent regenerator 23.

In the present embodiment, the auxiliary turbine 32 drives the $CO_2$ compressor 27 to compress the $CO_2$ gas 26 accompanied by the water vapor emitted from the absorbent regenerator 23 to obtain the compressed $CO_2$.

Instead of supplying the $CO_2$ gas to the $CO_2$ compressor 27, a power generator can be driven to introduce the emission steam 33 into the regenerating superheater 22 of the $CO_2$ recovery unit 24.

As a result, even when there is load variation (100% to 50%) of the boiler 15 and the steam turbines (the high-pressure turbine 11, the intermediate-pressure turbine 12, and the low-pressure turbine 13), the high-pressure turbine, the intermediate-pressure turbine, and the low-pressure turbine change according to the load variation and generate power. Accordingly, no influence is exerted on the power generation system and stable steam is supplied to the regenerating superheater 22 in the $CO_2$ recovery unit from the auxiliary turbine 32 using the extracted high-temperature and high-pressure steam 14. As a result, $CO_2$ recovery can be stably performed.

Test Example

Figure 4:
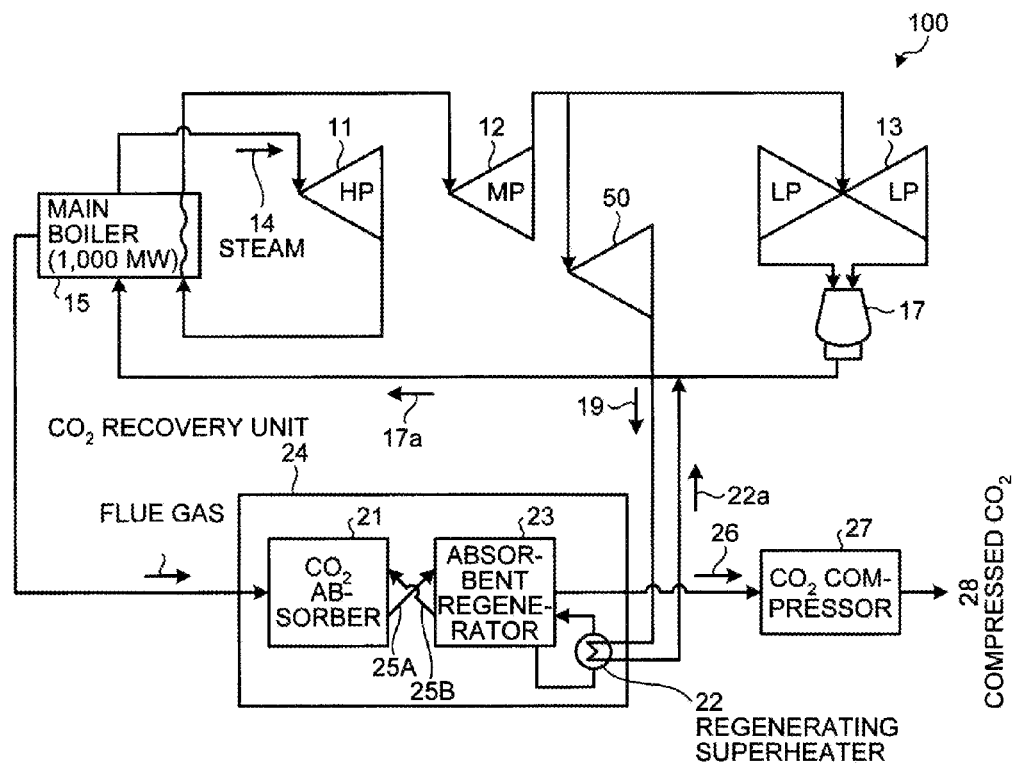
FIG. 4 is a schematic diagram of a carbon dioxide recovery system according to a conventional technique.

FIG. 4 is a schematic diagram of a carbon dioxide recovery system 100 according to a conventional technique. As shown in FIG. 4, the carbon dioxide recovery system according to the conventional technique includes an auxiliary turbine 50 that extracts steam from a middle portion between the intermediate-pressure turbine 12 and the low-pressure turbine 13 and recovers power using the steam. This recovery system uses emission steam 19 emitted from the auxiliary turbine 50 as a heat source of the regenerating superheater 22 of the absorbent regenerator 23.

For example, recovery of $CO_2$ from flue gas in a 1,000-MW coal combustion thermal power plant was examined.

An amount of steam of an ultra-super critical pressure boiler of the 1,000-MW coal combustion thermal power plant is 2,836 tons (T)/hour (H), and an amount of $CO_2$ generated from boiler flue gas is 733 T/H.

When assuming that 90% of $CO_2$ is recovered, an amount of recovered $CO_2$ is 660 T/H (15,840 T/D).

An amount of steam required by the $CO_2$ recovery unit 24 associated with the $CO_2$ recovery is 792 T/(3-kgG saturated water vapor conversion).

Table 1 shows this result.

It is confirmed in Table 2 that, in a case where a steam turbine output is 880 MW, 95 MW is consumed as $CO_2$ compressor power and the like and that the total output is 785 MW, resulting in an output decrease by about 21.5% in total.

Also in the system of the present invention, the same result as that in the conventional technique is obtained as shown in Table 3.

Therefore, it is confirmed that output decreases in the case where the conventional auxiliary turbine is used and in the case where the system of the present invention is used are equal and that the system can be operated more stably in the case where the auxiliary turbine is driven by the high-temperature and high-pressure steam extracted from the boiler of the present invention through the high-temperature and high-pressure steam extraction line when the load variation in the power-generating facilities is considered.

TABLE 1

| 1,000 MW ultra-super critical pressure boiler | |
|---|---|
| Steam | 2,836 T/H |
| $CO_2$ generation amount | 733 T/H |
| $CO_2$ recovery amount | 660 T/H |
| | (90% recovery) = 15,840 T/D |
| Steam required to recover $CO_2$ | 792 T/H (3 KgG. saturation) |

TABLE 2

| | |
|---|---|
| Steam turbine output | 880 MW |
| $CO_2$ compressor power etc. (consumption) | 95 MW |
| Total output | 785 MW |
| Output decrease | 21.5% |

TABLE 3

| 1,000 MW ultra-super critical pressure boiler | |
|---|---|
| Steam | 2,836 T/H |
| $CO_2$ generation amount | 733 T/H |
| $CO_2$ recovery amount | 660 T/H |
| | (90% recovery) = 15,840 T/D |
| Steam required to recover $CO_2$ | 792 T/H (3 KgG. Saturation) |
| Steam turbine output | 880 MW |
| $CO_2$ compressor power etc. (consumption) | 95 MW |
| Total output | 785 MW |
| Output decrease | 21.5% |

Second Embodiment

Figure 2:
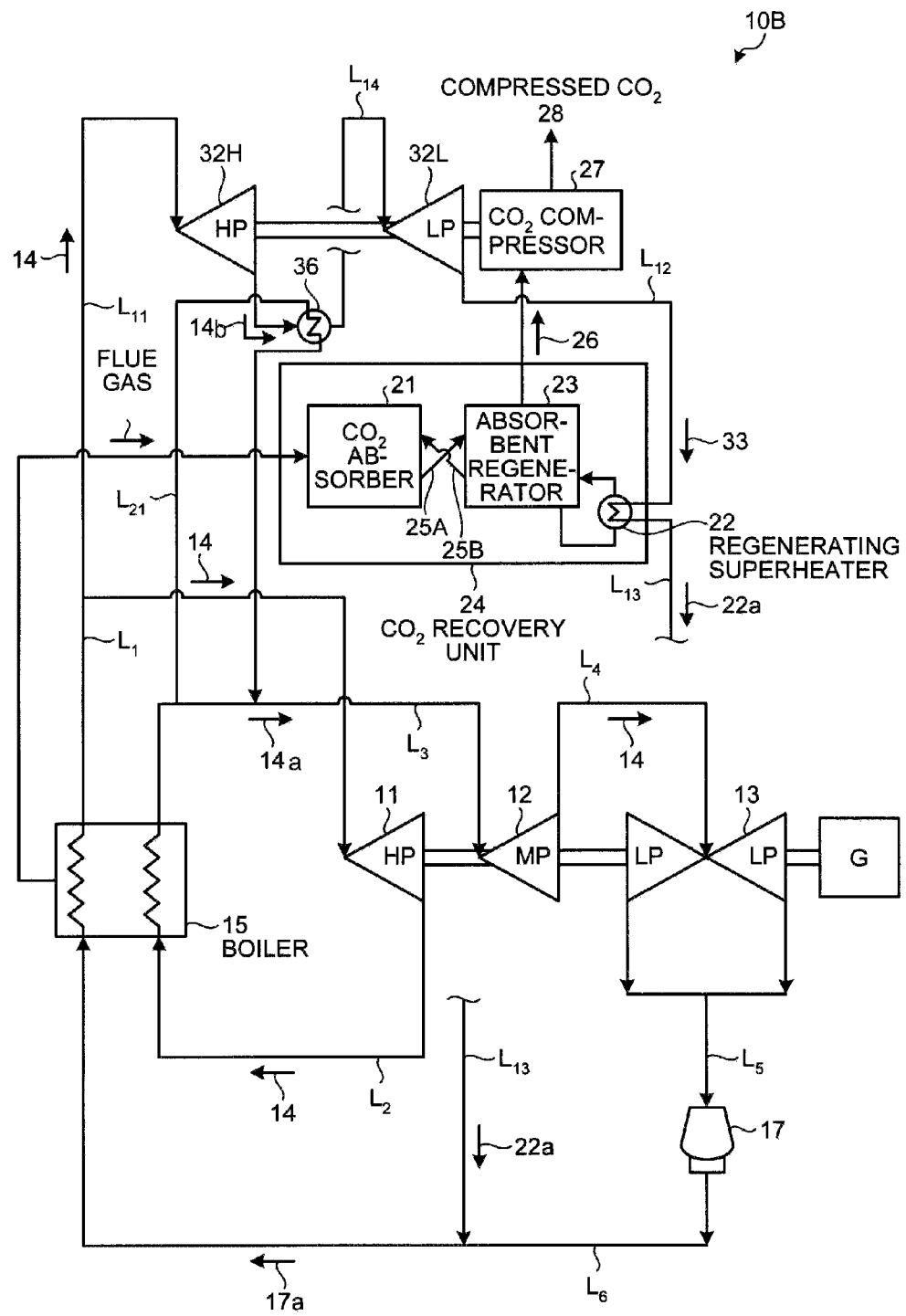
FIG. 2 is a schematic diagram of a carbon dioxide recovery system according to a second embodiment of the present invention.
Figure 3:
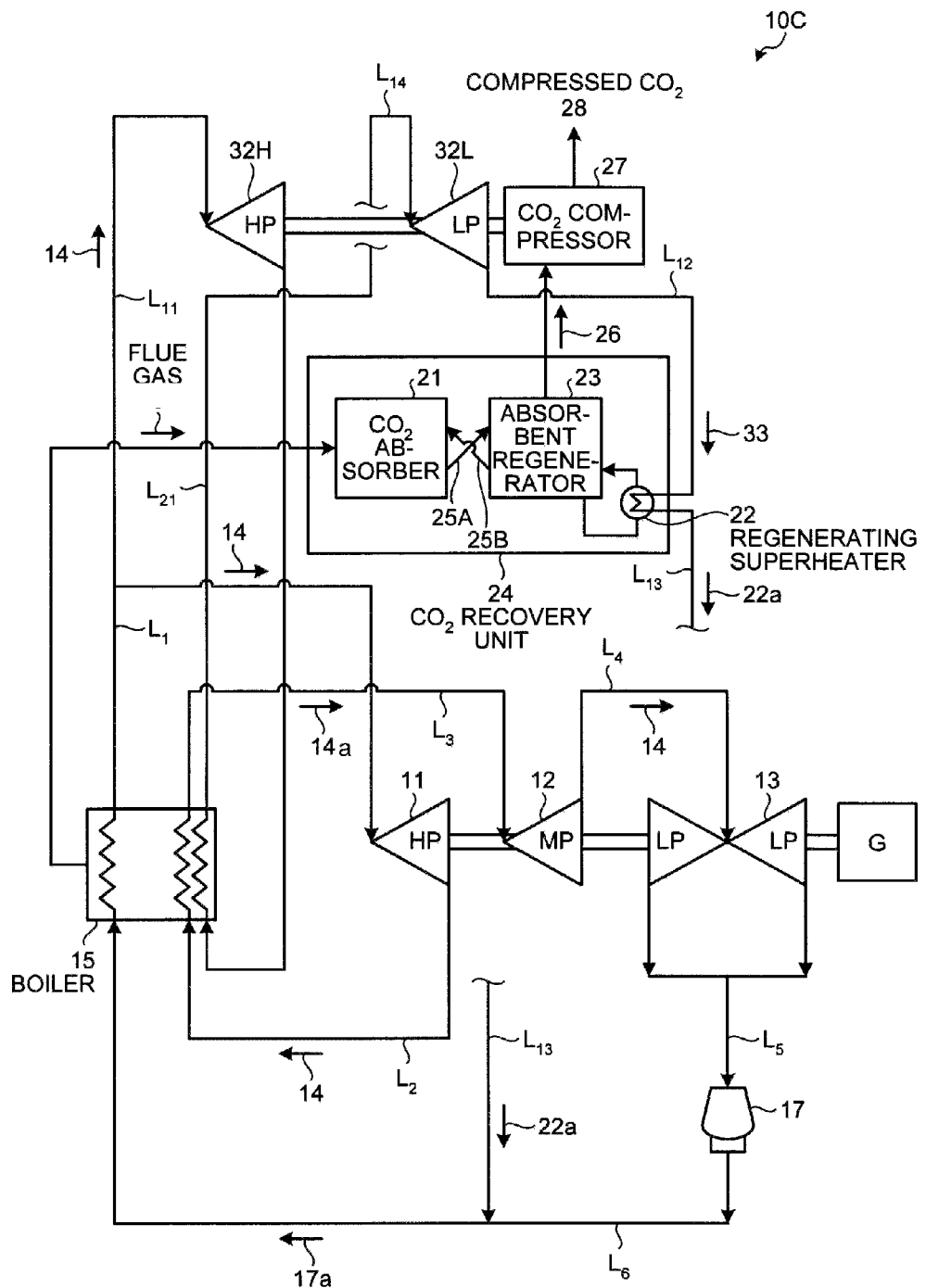
FIG. 3 is a schematic diagram of a carbon dioxide recovery system according to a modified second embodiment of the present invention.

A carbon dioxide recovery system according to a second embodiment of the present invention is explained with reference to the drawings. FIG. 2 is a schematic diagram of a carbon dioxide recovery system according to the second embodiment. FIG. 3 is a schematic diagram of another carbon dioxide recovery system according to the second embodiment.

As shown in FIG. 2, a carbon dioxide recovery system 10B according to the second embodiment includes two steam turbines in the carbon dioxide recovery system 10A of the first embodiment, in which one of the steam turbines is a high-pressure auxiliary turbine 32H and the other is a low-pressure auxiliary turbine 32L.

Intermediate steam 14a obtained by reheating in the boiler 15 the emission from the high-pressure turbine 11 is extracted by an extraction line $L_{21}$ before being introduced into the intermediate-pressure turbine 12, and a heat exchanger 36 is interposed on the extraction line $L_{21}$. The heat exchanger 36 is provided on the supply line $L_{14}$ for supplying emission from the high-pressure auxiliary turbine 32H, and heat exchange between the resuperheated intermediate steam and the emission from the high-pressure auxiliary turbine 32H is performed in the heat exchanger 36. In this way, the emission 14b to be supplied to the low-pressure auxiliary turbine 32L is reheated.

As a result, the emission from the auxiliary turbine can be reheated without using a reheater in the boiler 15.

As shown in FIG. 3, in a carbon dioxide recovery system 10C, emission from the high-pressure turbine 32H is reheated in the boiler 15 to be used in the low-pressure turbine 32L.

REFERENCE SIGNS LIST 10A, 10B carbon dioxide recovery system
11 high-pressure turbine
12 intermediate-pressure turbine
13 low-pressure turbine
14 steam
15 boiler
21 carbon dioxide absorber (absorber)
22 regenerating superheater
23 absorbent regenerator (regenerator)
24 carbon dioxide recovery unit
31 steam
32 auxiliary turbine
32H high-pressure auxiliary turbine
32L low-pressure auxiliary turbine
33 emission steam

The invention claimed is:
1. A carbon dioxide recovery system comprising:
a boiler that generates high temperature and high-pressure steam;
a first high-temperature and high-pressure steam line and a second high-temperature and high-pressure steam line which are connected to the boiler and branch the high-temperature and high-pressure steam as a first high- temperature and high-pressure steam and a second high-temperature and high-pressure steam, respectively;

a high-pressure turbine that is connected to the first high-temperature and high-pressure steam line and driven by the first high-temperature and high-pressure steam;

an intermediate-pressure turbine driven by intermediate-pressure steam obtained by resuperheating in the boiler the first high-temperature and high-pressure steam emitted from the high-pressure turbine;

a low-pressure turbine driven by emission from the intermediate-pressure turbine;

a carbon dioxide recovery unit including
  a carbon dioxide absorber having a carbon dioxide absorbent that absorbs and reduces carbon dioxide in flue gas emitted from the boiler, and
  an absorbent regenerator having a regenerating superheater that regenerates the carbon dioxide absorbent having absorbed the carbon dioxide to obtain a regenerated carbon dioxide absorbent;

a high-pressure auxiliary turbine that is connected to the second high-temperature and high-pressure steam line, recovers power with the second high-temperature and high-pressure steam and emits emission steam;

a line that supplies the emission steam emitted from the high-pressure auxiliary turbine;

a low-pressure auxiliary turbine that is connected to the line that supplies the emission steam emitted from the high-pressure auxiliary turbine, recovers power with the emission steam emitted from the high-pressure auxiliary turbine; and a steam supply line that supplies emission steam emitted from the low-pressure auxiliary turbine to the regenerating superheater of the carbon dioxide regenerator as a heat source;

wherein the boiler is provided on the line that supplies the emission steam emitted from the high-pressure auxiliary turbine, the emission steam emitted from the high-pressure auxiliary turbine is resuperheated by the boiler and the resuperheated emission steam is introduced into the low-pressure auxiliary turbine.

2. A carbon dioxide recovery method of recovering carbon dioxide absorbed in the carbon dioxide absorbent using the carbon dioxide recovery system according to claim 1.

* * * * *